United States Patent [19]

Plangger

[11] 3,793,618

[45] Feb. 19, 1974

[54] DEPTH ALARM SYSTEM

[75] Inventor: David L. Plangger, Buchanan, Mich.

[73] Assignee: Heath Company, Benton Harbor, Mich.

[22] Filed: Oct. 30, 1972

[21] Appl. No.: 301,831

[52] U.S. Cl. .............................. 340/3 R, 340/5 C
[51] Int. Cl. ............................................. G01s 9/68
[58] Field of Search ............ 340/1 R, 3 C, 3 R, 5 C

[56] References Cited
UNITED STATES PATENTS

| 3,223,965 | 12/1965 | Beebe | 340/5 C X |
| 2,998,591 | 8/1961 | Lovett | 340/1 R |

*Primary Examiner*—Richard A. Farley
*Attorney, Agent, or Firm*—William R. Sherman; Roylance, Abrams, Berdo & Kaul

[57] ABSTRACT

An electronic depth alarm circuit for use with a depth sounder generates an alarm signal when an underwater object located within a preset range depth from the depth sounder is detected. The circuit comprises a first monostable circuit which is triggered by the energy pulses transmitted by the depth sounder and provides pulses having a duration proportional to the preset range depth. The preset range depth pulses enable an AND-gate circuit which also receives the echo pulses detected by the depth sounder as well as inhibiting pulses provided by a second monostable circuit also triggered by the transmitted pulses. The echo pulses will pass through the AND-gate circuit and activate an alarm display only if they appear after the trailing edge of the inhibiting pulses and before the trailing edge of the preset range depth pulses. The inhibiting pulses prevent the alarm signal from being generated when false alarm signals such as ringing of the transmitted pulses in the transducer and air bubbles on the transducer are detected by the receiver. A third monostable circuit triggered by the trailing edge of the preset range depth pulses provides pulses which control the display device of the depth sounder so as to display the preset range depth.

8 Claims, 4 Drawing Figures

DEPTH ALARM SYSTEM

BACKGROUND OF THE INVENTION

The invention relates to alarm systems and is more particularly concerned with a depth alarm system associated with a depth sounder, such as that available from the Heath Company of Benton Harbor, Mich., under type number MI 19, so as to generate an alarm signal when an underwater object is detected within a preset range depth from the depth sounder.

Depth sounders are well known in the art and typically include a piezo-electric acoustic transducer intended to be mounted on the outside of that portion of the hull of a boat which is immersed in the water on which the boat is floating. A control circuit causes the acoustic transducer to emit acoustic pulses at regular intervals of time. The acoustic transducer also detects any reflected pulse resulting from the emitted pulse, the time interval between the emission of a pulse and the detection of its corresponding reflected pulse being proportional to the depth from which reflection occurred, i.e., the depth of the bottom of the body of water, or the depth of a submerged reflecting object such as a school of fish. The depth of the reflecting object is usually displayed by using a flash lamp associated with a rotating disc.

The disc is arranged to rotate within a fixed annular scale member with the periphery of the disc closely adjacent a plurality of angularly spaced-apart index marks provided on the scale member. The index marks represent different depths, typically in feet, to be measured by the depth sounder. The flash lamp is mounted on the disc adjacent to its periphery and is rotatable therewith. The lamp is connected by a conventional slip ring arrangement, to be briefly energized by the control circuit adapted to process the pulses detected by the acoustic transducer. The control circuit causes the acoustic transducer to emit an acoustic pulse, typically vertically downwardly in the water, and at the same time briefly energizes the lamp. The scale member is arranged so that the index mark representative of zero depth is radially aligned with the lamp at this instant. The control circuit again briefly energizes the lamp in response to the detection of the aforementioned corresponding reflected pulse, the angle through which the disc and lamp have rotated since the previous energization of the lamp being a measure of the depth at which reflection occurred.

As already mentioned, such a depth sounder can be used to determine the depth of the bottom of the body of water, knowledge of this depth being very helpful for the operator of the boat for navigation in areas of shallow waters. However, the operator of the boat cannot constantly look at the display device and mentally compare the depth of the bottom with the underwater depth of the hull of the boat. Therefore, depth sounders often include additional circuitry so as to generate a warning or alarm signal, usually an audible signal, when an underwater object such as the bottom of the water is detected within a preset range depth from the transducer. The preset range depth must be adjustable in order to match it with the depth of the hull or the expected depth of the school of fish. In the alarm systems of the prior art, the adjustment can be set only for a few preselected depths, which are separated by large increments. This type of adjustment by discrete values does not allow to closely match the preset depth with the underwater depth of the hull or the expected depth of the school of fish.

It is the object of the present invention, therefore, to provide a depth alarm circuit in which the range for presetting the alarm depth is continuous.

It is a further object of the present invention to provide such a circuit wherein the preset depth is displayed directly on the display device while being set.

A further object of the present invention is to provide an all electronic depth alarm circuit, which circuit is simple and inexpensive.

SUMMARY OF THE INVENTION

According to the present invention, a depth alarm circuit for generating an alarm signal when an underwater object is detected within a preset range depth from the transducer of an associated depth sounder includes a first monostable circuit triggered by energy pulses transmitted by the depth sounder for providing pulses having a duration proportional to the desired preset range depth. The preset range depth pulses are applied to a logic circuit which also receives signals representative of echo pulses detected by the depth sounder as well as inhibiting pulses provided by a second monostable circuit also triggered by the transmitted pulses. The echo pulses will pass through the logic circuit and activate an alarm display circuit such as an oscillator-loudspeaker arrangement only if they appear after the trailing edge of the inhibiting pulses but before the trailing edge of the preset range depth pulses. A third monostable circuit triggered by the trailing edge of the preset range depth pulses provides pulses which control the display device of the depth sounder so as to display the preset range depth.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of this apecification, and wherein.

DESCRIPTION OF AN ILLUSTRATIVE EMBODIMENT

Figure 1:
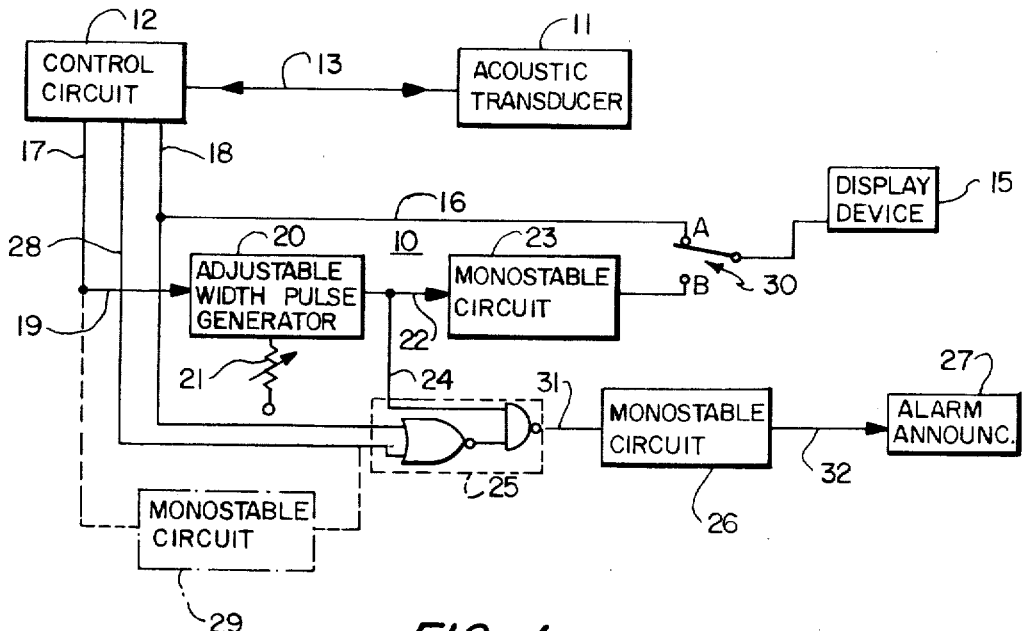
FIG. 1 is a schematic diagram, in block form, of a depth sounder including a depth alarm circuit in accordance with the present invention.

The specific embodiment of the depth alarm circuit according to the present invention as decided herein is intended for use with a depth sounder similar to a type MI-19 depth sounder available from the Heath Company of Benton Harbor, Mich. The depth sounder will therefore be only briefly described with reference to FIG. 1 to the extent necessary to understand the present invention.

The depth sounder comprises an acoustic transducer 11 which is intended to be mounted on the outside of the hull of a boat, immersed in the water on which the boat is floating. A control circuit 12 generates electrical control signals known as transmitter trigger pulses and illustrated in FIG. 2a, which are sent on a conductor 13 to the acoustic transducer 11 to cause the transducer to emit pulses, typically vertically downwardly in the water, and at the same time to cause, by signals on conductors 18 and 16, a display device 15 to show a zero depth. The transducer 11 also receives any reflected pulses, called echo or return pulses, resulting from reflection of emitted pulses, the time interval between the emission of a pulse and the detection of its corresponding reflected pulse being proportional to the depth at which reflection occurred. The echo pulses, two of which are illustrated in FIG. 2e, are coupled on a conductor 16 and through a single-pole, double-throw switch 30, shown in its rest position wherein the movable contact is connected to fixed contact A, to the display device 15 which then shows the depth of the detected object. The transmitted pulses as well as the echo pulses are also applied on conductor 17 to the depth alarm display circuit and on conductor 18 to the depth alarm circuit according to the present invention and shown generally as 10.

The depth alarm circuit performs two functions: one is to display the preset range depth and the other is to generate an alarm signal when an underwater object is detected within the preset range depth.

The display function is carried out by the portion of the device including an adjustable width monostable pulse generator circuit 20, which can be a monostable multivibrator having a variable time constant, a monostable multivibrator circuit 23, a switch 30 and the display device 15 of the depth sounder when the switch 30 is in the B position (opposite that shown in FIG. 1). More specifically, pulse signals coincide in time with the transmitted pulses are applied via a conductor 19 to a variable pulse width monostable circuit 20 that provides pulses having a duration that can be adjusted by means of a variable resistor 21 connected in its RC circuit. As shown in FIG. 2b, the pulses provided by the monostable circuit 20 start with the trailing edge of the transmitted pulse if the inhibiting pulse starts before, or simultaneously with, the preset range depth pulse. Their duration depends on the range of depth within which it is desired to have an alarm signal when an underwater object is detected. The output terminal of the monostable circuit 20 is coupled via a path 22 to a monostable circuit 23 triggered by the trailing edge of the preset range depth pulse provided by the monostable circuit 20. The pulses provided by the monostable 23 are illustrated in FIG. 2c and have a duration approximately equal to that of the echo pulses. They are coupled via the switch 30 to the display device 15 which gives an indication of the preset range alarm depth when the switch 30 is in the B position.

It will be noted that the switch 30 and the moving wiper of the variable resistor 21 can be combined and operated by a single control knob, the switch being operated by axial movement of the knob toward and away from the front panel of the apparatus, and the resistor being adjusted by rotary movement of the knob. When the control knob is in its rest position, against the front panel of the depth sounder, the switch 30 is in the A position so as to cause the display device 15 to show the depth of the echoes; when the control knob is pulled out, the switch 30 is in the B position which allows display device 15 to show the alarm preset range depth while the effective value of resistor 21 is being adjusted.

The alarm function of the circuit according to the present invention is carried out by the monostable circuit 20, a logic circuit 25, the monostable circuit 26 and the alarm display 27. More specifically, the output terminal of the monostable circuit 20 is connected via a conductor 24 to one of the three input terminals of a logic circuit 25. The two other input terminals of the logic circuit 25 are connected to the control circuit 12 so as to receive respectively the echo pulses via a conductor 18 and inhibiting or blanking pulses (illustrated in FIG. 2d) via a conductor 28. The inhibiting pulses are synchronized with the transmitted pulses and have a sufficient duration so that false alarm signals such as ringing of the transmitted pulse in the acoustic transducer and air bubbles on the acoustic transducer will not be detected by the depth alarm circuit and give a false alarm. Alternatively, the inhibiting pulses, if not available from the control circuit 12, can be provided by a monostable circuit 29, shown in phantom line, which can then be triggered by signals representative of the transmitted pulses which signals are available on conductor 17.

It will be apparent that the logic circuit 25 will pass an echo pulse (illustrated in FIG. 2e) only if it appears during the preset range depth pulse but after the inhibiting pulse. The echo pulses passing through the logic circuit 25 are coupled via a path 31 to a monostable circuit 26 which has a relatively long unstable state and therefore delivers a signal as illustrated in FIG. 2f as long as echo pulses are passing through the logic circuit 25.

The output terminal of the monostable circuit 26 is connected via a conductor 32 to the alarm display 27 to activate it. The alarm display 27 is designed to generate a signal which demands the attention of the operator of the boat such as the flashing of a lamp or, preferably, an audible signal.

Figure 2:
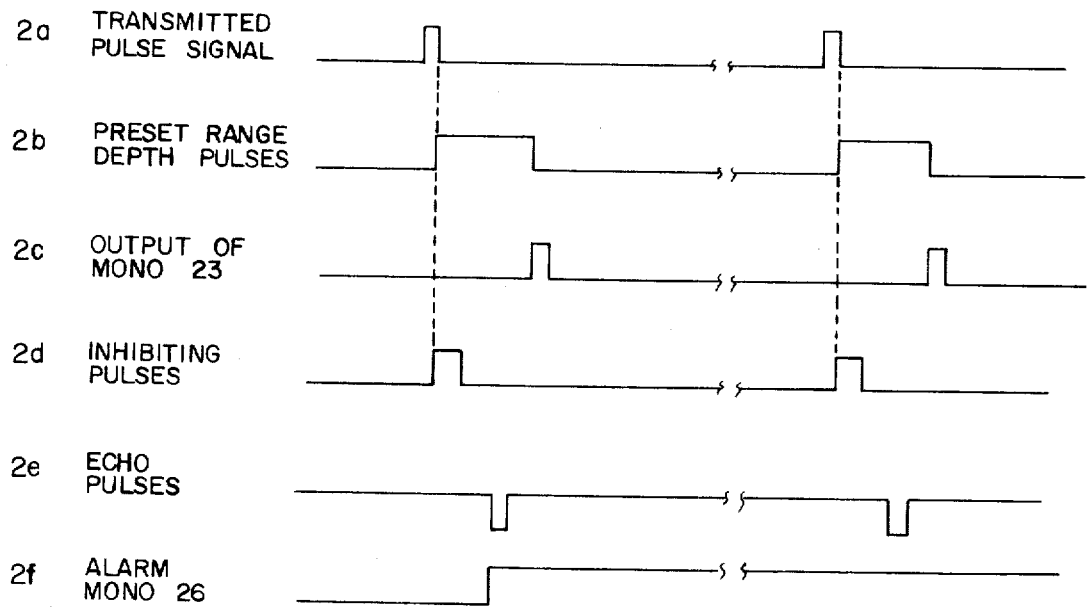
FIG. 2 is a timing diagram showing signals illustrating the mode of operation of the depth alarm circuit shown in FIG. 1.

The mode of operation of the circuit of FIG. 1 will be briefly explained in conjunction with the signal diagrams of FIG. 2. The transmitter trigger pulses are used (FIG. 2a) to activate the monostable circuit 20 which delivers pulses (FIG. 2b) which in turn trigger the monostable circuit 23. When the switch 30 is in the B position, the output pulses (FIG. 2c) of the monostable circuit 23 will be applied to the display device which will indicate the preset depth range which it is desired to have an alarm signal. By varying the resistor 21, the preset alarm depth changed within a continuous range. When the switch 30 is in the position shown in FIG. 1, the echo pulses are applied to the display device which then indicates the depth of the reflecting object. The output pulses of the monostable circuit 20 enable the logic circuit 25 which passes an echo pulse (FIG. 2e) received if it appears after the blanking pulse but before the end of the enabling time. The echo pulses passing through the logic 25 trigger the monostable circuit 26 which will stay in the unstable state (FIG. 2f) and then activate the alarm display circuit 27 as long as its input terminal is supplied with echo pulses passing through the logic circuit 25.

DETAILED DESCRIPTION OF AN ILLUSTRATIVE EMBODIMENT

Figure 3:
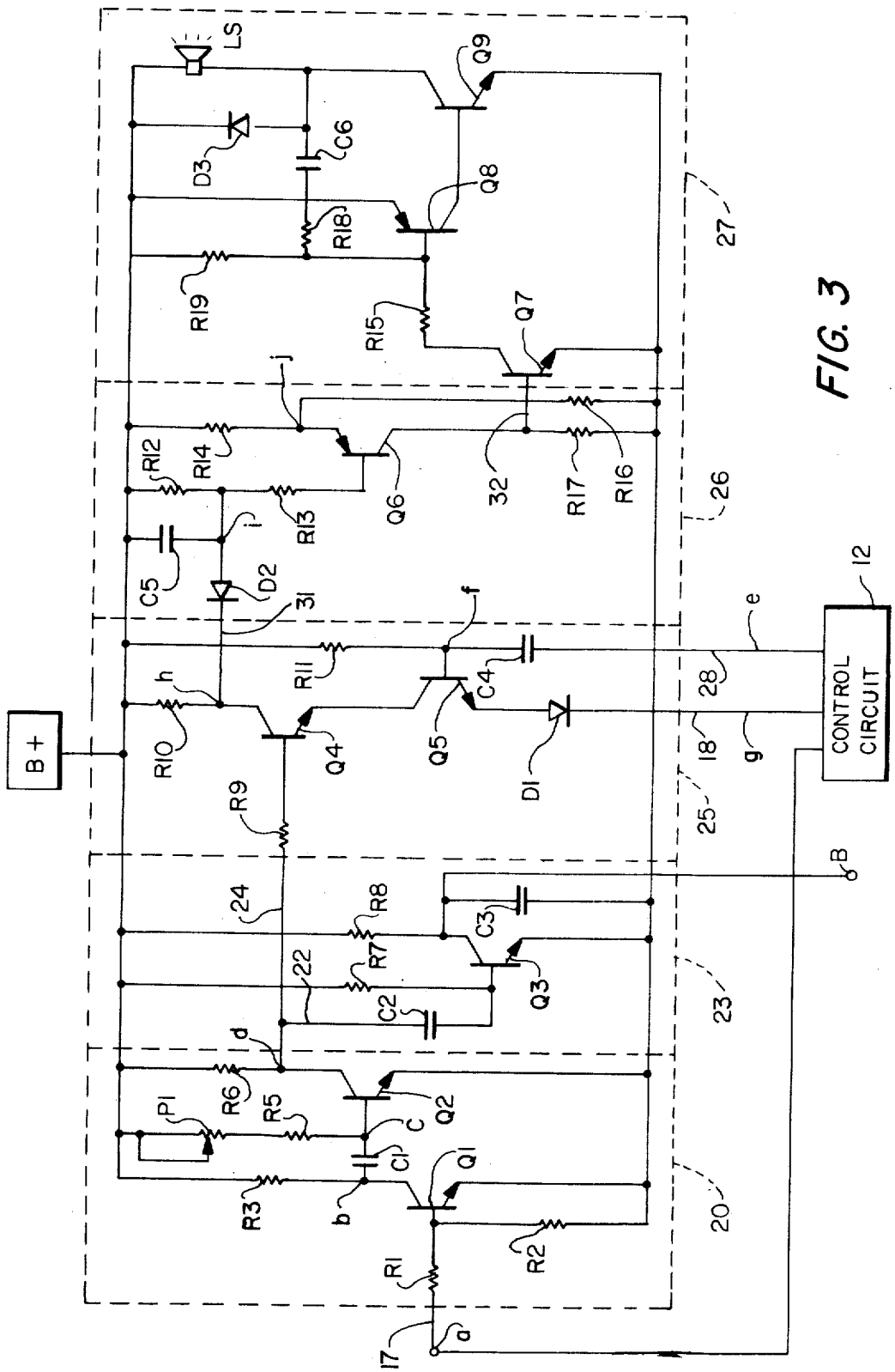
FIG. 3 is a detailed schematic diagram of an embodiment of a depth alarm circuit in accordance with the present invention.

FIG. 3 is a detailed diagram of an illustrative embodiment of Circuit 10 in accordance with the present invention. In FIG. 3, the different parts of the circuit of FIG. 1 have been delimited by dashed lines bearing the same references. Monostable circuit 20 includes an NPN transistor $Q_2$ which is preceded by an inverter $Q_1$. Transistor $Q_1$ has its emitter directly connected to ground, its collector connected to a regulated power supply B+ through a resistor R3 and its base connected to ground through a resistor R2 and to the input conductor 17 through a resistor R1. The collector of transistor Q1 is connected to the base of transistor Q2 through a capacitor C1. The base of transistor Q2 is also connected to the regulated power supply B+ through a resistor R5 in series with a potentiometer P1 which corresponds to variable resistor 21 of FIG. 1. The emitter of transistor Q2 is directly connected to ground and its collector is connected to the regulated power supply B+ through a resistor R6. The collector of transistor Q2 is connected to the monostable circuit 23 and to one input of logic 25.

The monostable circuit 23, includes an NPN transistor Q3 having its base connected to the collector of transistor Q2 through a capacitor C2 and to the regulated power supply B+ through a resistor R7. The emitter of Q3 is directly connected to ground while its collector is connected to the regulated power supply B+ by a resistor R8 and to ground by a decoupling capacitor C3. The RC constant of resistor R7 and capacitor C2 determines the duration of the unstable state of the transistor Q3. The output signal for driving the display device 15 (not shown in FIG. 3) is taken from the collector of transistor Q3.

Logic 25 includes two serially connected NPN transistors Q4 and Q5, a resistor R9 connecting the base of the transistor Q4 to the collector of the transistor Q2, a resistor R10 connected between the collector of the transistor Q4 and the regulated power supply B+, a resistor R11 connected between the regulated power supply B+ and the base of the transistor Q5, and a capacitor C4 connecting the base of the transistor Q5 to the conductor 28 conducting the blanking pulses. The emitter of the transistor Q5 is connected to the conductor 18, at which the echo pulses are applied through a diode D1.

The monostable circuit 26 comprises a PNP transistor Q6 having its base connected to the collector of the transistor Q4 through a resistor R13 and a diode D2, the common point of which is connected to the regulated power supply B+ through a capacitor C5 and a resistor R12 connected in parallel with each other; the collector of the transistor Q6 is connected to the ground through a resistor R17 while its emitter is connected to the common point of a voltage divider comprising a resistor R16 connected to ground and a resistor R14 connected to the regulated power supply B+.

When the alarm signal is an audible signal the circuit 27 of FIG. 1 comprises, as shown in FIG. 3 an NPN transistor Q7 having its emitter connected to the ground, its base connected to the collector of the transistor Q6 and its collector connected to the base of a PNP transistor Q8 through a resistor R15. The emitter of transistor Q8 is connected to the positive supply B+ and the base of a transistor Q8 is connected to B+ through a resistor R19, to the collector of Q7 through the series combination of R18 and C6. The emitter of the transistor Q9 is connected to the ground and its collector is connected to the power supply B+, or to a non-regulated power supply, through a speaker LS as well as to the base of transistor Q8 through a resistor R18 and a capacitor C6 in series. A diode D3 is connected in parallel with the speaker LS.

The transistors Q8 and Q9 in combination with the feedback path comprised of a resistor R18 and of a capacitor C6 form a low-frequency oscillator (an astable multivibrator) which causes the speaker LS to emit an audible signal.

Figure 4:
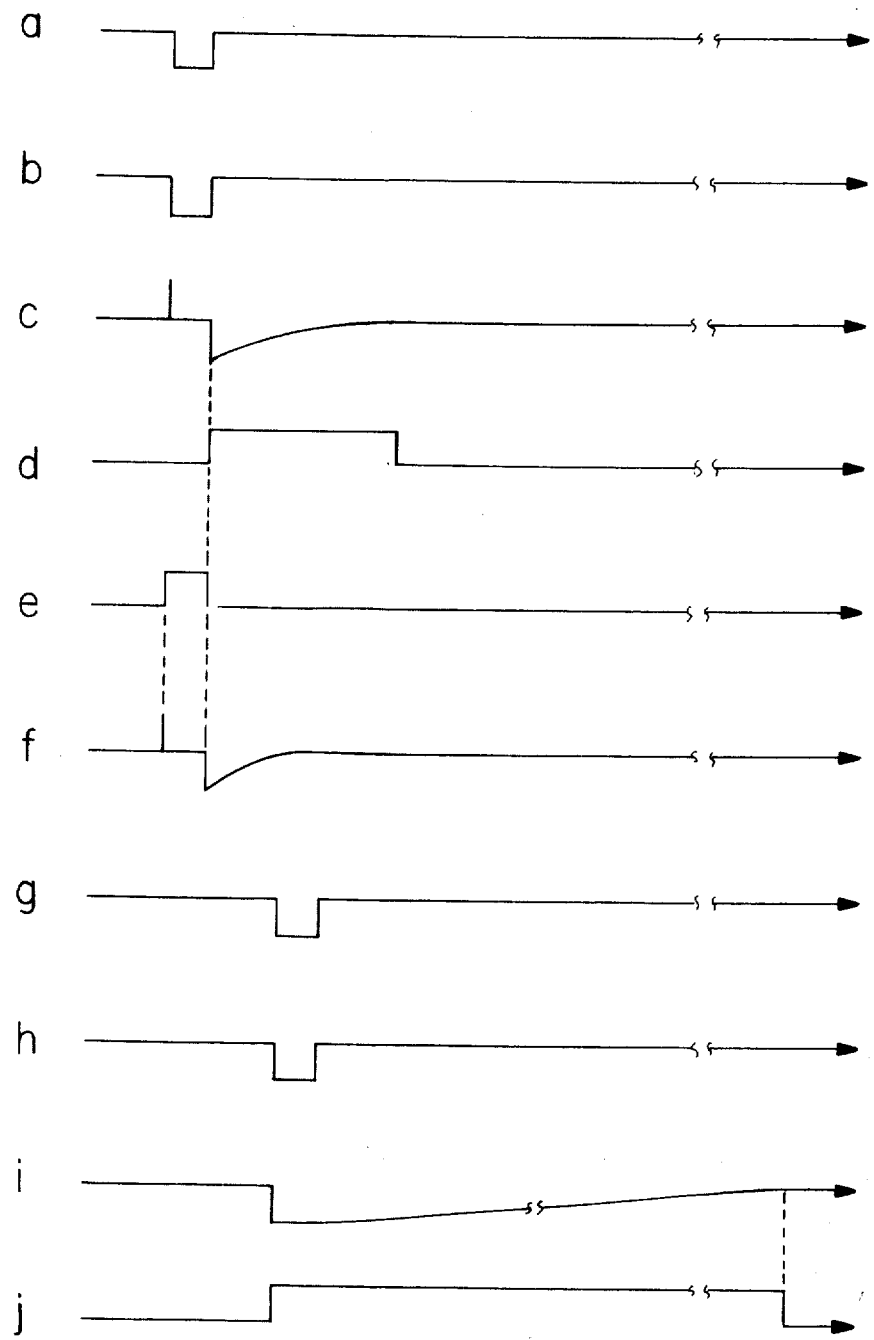
FIG. 4 is a timing diagram showing signals illustrating the mode of operation of the depth alarm circuit of FIG. 3.

The mode of operation of the illustrative embodiment of FIG. 3 will be now explained with reference to FIG. 4 which shows diagrams of signals appearing at specific points a to j of the circuit, said diagrams and points being identified by the same reference characters.

The negative going pulse from the control circuit 12 (FIG. 4A) on the conductor 17, turns the transistor Q1 off. The positive going pulse provided at the collector of the transistor Q1 (FIG. 4A) is differentiated by the capacitor C1 in combination with resistors R5 and potentiometer P1 (FIG. 4C) and turns the transistor Q2 off (FIG. 4D) for a time corresponding to the discharge of the capacitor C1 through the resistor R5 and the potentiometer P1.

The pulse at the point of the collector of the transistor Q2 turns the transistor Q4 on if the transistor Q5 is on. However, the transistor Q5 cannot be turned on immediately after the transmitted pulse due to the blanking effect created by the differentiation (FIG. 4F) by the resistor R11 and the capacitor C4 of the positive going pulse (4E) provided by the control circuit 12 on the conductor 28. After the blanking time defined by the discharging time of capacitor C4 through resistor R11, resistor Q5 will conduct any other time that Q4 conducts if there is a negative going pulse (echo pulse of FIG. 4G) provided by the control circuit 12 on the conductor 18 to forward bias the diode S1. Then both transistors Q4 and Q5 are conducting, and a negative going pulse (FIG. 4H) will appear at the collector of the transistor Q4 which will forward bias the diode D2. This will cause the capacitor C5 to charge very quickly and therefore the transistor Q6 will conduct and remain on until the capacitor C5 is discharged (FIG. 4I) by the current flowing in the base of the transistor Q6.

The RC discharge constant of the capacitor C5 must be large enough to prevent its complete discharge in one period of the transmitted pulses. Consequently, the transistor Q6 will be on as long as an object is detected within the preset alarm depth. Usually, the RC constant is equal to several times the period of transmitted pulses in order to have a safety margin in case of a failure to detect the dangerous underwater object for a few successive periods.

FIG. 4J illustrates the signal appearing at the collector of the transistor Q6. When the transistor Q6 conducts, it turns on the transistor Q7 which activates the alarm display device 27 so as to cause the multivibrator including transistors Q8 and Q9 to oscillate.

The invention has been described in detail with reference to a preferred embodiment thereof but it will be understood that variations and modifications can be ef-

What is claimed is:

1. A depth sounder system comprising; means for transmitting pulses of acoustic energy and for receiving pulses of energy reflected by an underwater object, means for displaying the interval of time between transmission of a pulse and the corresponding receipt of a pulse as a function of the depth of said underwater object;
   a depth alarm circuit comprising means for generating an alarm signal when an underwater object is detected within a preset range depth;
   means for adjusting said preset range depth comprising an adjustable width pulse generator circuit responsive to the transmitted pulses to provide electrical pulses each having a duration proportional to the preset range depth;
   means for gating the electrical pulses provided by said adjustable width generator circuit with signals representative of the reflected pulses to pass the reflected pulses when an underwater object is detected within the preset range depth;
   means responsive to the electrical pulses provided by the means for gating for providing an alarm signal as long as signals representative of the reflected pulses are passing through said means for gating;
   means for producing inhibiting pulses concurrently with the pulses proportional to preset depth range but having a shorter duration and for applying said inhibiting pulses to said gating means; and
   means for controlling said means for displaying to display said preset range depth during adjustment thereof.

2. A depth sounder system according to claim 1 wherein said means for producing inhibiting pulses includes a monostable circuit triggered by the transmitted pulses.

3. A depth sounder system comprising, means for transmitting energy pulses, means for receiving reflected pulses corresponding to the energy reflected by an underwater object, means for displaying the interval of time between the transmitted pulses and the corresponding received pulse as a function of the depth of said underwater object, and a depth alarm circuit comprising first means for providing first electrical pulses having a duration proportional to a first depth range within which it is desired to generate an alarm signal when an underwater object is detected, second means associated with said display means for displaying said first depth range, third means for providing second electrical pulses having a duration proportional to a second shorter depth range within which the generation of an alarm signal is not desirable, fourth means responsive to said first and second electrical pulses for providing third electrical pulses when reflected pulses appear during said first electrical pulses but after said second electrical pulses, and fifth means responsive to said third electrical pulses for providing an alarm signal, whereby an alarm signal is generated when an underwater object is detected within said first depth range but outside said second depth range.

4. A depth sounder system according to claim 3 wherein said first means comprises a monostable circuit triggered by the transmitted pulses and having an adjustable unstable state.

5. A depth sounder system according to claim 3 wherein said second means comprises a monostable circuit triggered by the trailing edge of said first electrical pulses and switch means for connecting the display means either to said monostable circuit or to said receiver means.

6. A depth sounder system according to claim 3 wherein said third means comprises a monostable circuit triggered by the transmitted pulses.

7. A depth sounder system according to claim 3 wherein said fourth means comprises a logic circuit.

8. A depth sounder system according to claim 7 wherein said fifth means comprises a low-frequency oscillator activating a loudspeaker.

* * * * *